(12) United States Patent
Frericks et al.

(10) Patent No.: US 8,426,482 B2
(45) Date of Patent: Apr. 23, 2013

(54) METHOD FOR PRODUCING VISCOELASTIC POLYURETHANE FLEXIBLE FOAMS

(75) Inventors: Ansgar Frericks, Emsbueren (DE);
Heinz-Dieter Lutter, Lembruch (DE);
Edmund Stadler, Hollfeld (DE);
Heinz-Juergen Schroeder, Lauchhammer (DE); Kirsten Simon, Asendorf (DE); Andre Meyer, Lemfoerde (DE); Franck Pomeris, Magny le Hongre (FR)

(73) Assignee: BASF SE, Ludwigshafen (DE)

( * ) Notice: Subject to any disclaimer, the term of this patent is extended or adjusted under 35 U.S.C. 154(b) by 2 days.

(21) Appl. No.: 13/125,867

(22) PCT Filed: Oct. 19, 2009

(86) PCT No.: PCT/EP2009/063633
§ 371 (c)(1),
(2), (4) Date: Apr. 25, 2011

(87) PCT Pub. No.: WO2010/046326
PCT Pub. Date: Apr. 29, 2010

(65) Prior Publication Data
US 2011/0218258 A1 Sep. 8, 2011

(30) Foreign Application Priority Data
Oct. 24, 2008 (EP) ..................................... 08167561

(51) Int. Cl.
*C08G 18/28* (2006.01)

(52) U.S. Cl.
USPC ........... 521/173; 521/128; 521/129; 521/130; 521/164; 521/167; 521/170; 521/172; 521/174

(58) Field of Classification Search .................. 521/128, 521/129, 130, 164, 167, 170, 174, 172, 173
See application file for complete search history.

(56) References Cited

U.S. PATENT DOCUMENTS 7,361,695 B2 * 4/2008 Tu et al. ........................ 521/128
2004/0254256 A1 12/2004 Lockwood et al.
2009/0170972 A1 7/2009 Sonney et al.
2009/0264547 A1 * 10/2009 Klesczewski et al. ........ 521/156
2010/0227938 A1 * 9/2010 Bauer et al. .................... 521/170

FOREIGN PATENT DOCUMENTS

| DE | 33 16 652 | 12/1984 |
|---|---|---|
| DE | 37 08 961 | 10/1988 |
| DE | 37 10 731 | 4/1989 |
| DE | 196 34 392 | 3/1998 |
| DE | 199 24 803 | 11/2000 |
| DE | 199 36 481 | 2/2001 |
| EP | 1 240 228 | 9/2002 |
| WO | 2004 020497 | 3/2004 |
| WO | 2007 085548 | 8/2007 |
| WO | 2007 111834 | 10/2007 |
| WO | 2008 003567 | 1/2008 |
| WO | WO 2009106240 A2 * | 9/2009 |

OTHER PUBLICATIONS

International Search Report issued Jan. 25, 2010 in PCT/EP09/063633 filed Oct. 19, 2009.

* cited by examiner

Primary Examiner — John Cooney
(74) Attorney, Agent, or Firm — Oblon, Spivak, McClelland, Maier & Neustadt, L.L.P.

(57) ABSTRACT

Invention relates to a process for producing viscoelastic flexible polyurethane foams by reacting a) polyisocyanates with b) compounds having at least two hydrogen atoms which are reactive toward isocyanate groups, wherein as b) a mixture of bi) from 25 to 70% by weight of a hydroxyl-comprising natural oil or fat or a reaction product of a hydroxyl-comprising natural oil or fat with alkylene oxides, bii) from 3 to 30% by weight of at least one polyether having a hydroxyl number of from 100 to 800 mg KOH/g and a functionality of 3-5 selected from the group consisting of polyether prepared by addition of alkylene oxides onto an amine, biii) 20-50% by weight of at least one polyether alcohol having a hydroxyl number of from 10 to 80 mg KOH/g and a functionality of 2-5, where the proportion of ethylene oxide is 5-25% by weight, based on the weight of the polyether alcohol, and at least part of the ethylene oxide is added on at the end of the polyether chain, biv) >0-8% by weight of at least one polyether alcohol having a functionality of 2-4, a hydroxyl number of 15-60 mg KOH/g and a content of ethylene oxide of >50% by weight of the polyether alcohol is used.

21 Claims, No Drawings

METHOD FOR PRODUCING VISCOELASTIC POLYURETHANE FLEXIBLE FOAMS

The invention relates to a process for producing viscoelastic flexible polyurethane foams by reacting polyisocyanates with compounds having at least two hydrogen atoms which are reactive toward isocyanate groups.

Viscoelastic flexible polyurethane foams have attained ever greater importance in recent years. They are used, in particular, for producing upholstery, mattresses or for damping of vibrations, for example in foam backing of carpets.

For the purposes of the present invention, a foam is referred to as viscoelastic when it has a loss factor tan delta at 25° C. in the torsion pendulum test in accordance with DIN 53445 of greater than 0.15, preferably greater than 0.2. It is also preferred that the foams according to the invention display viscoelastic behavior over a wide temperature range, i.e. from −20° C. to +50° C., but at least from −5 to +30° C.

The foam can likewise be referred to as viscoelastic when it has a rebound resilience measured in accordance with DIN EN ISO 8307 of less than 30%, preferably from 5 to 25%, particularly preferably from 8 to 22%.

In particular, it is preferred that the foam according to the invention satisfies both the criteria indicated above for the loss factor and for the rebound resilience.

The viscoelastic foams according to the invention having the above-described damping coefficients are known as "limp" foams.

The viscoelastic properties are preferably set by choice of the starting materials, in particular the polyols.

One possible way of producing viscoelastic foams is the use of mixtures of preferably trifunctional polyether alcohols having a hydroxyl number of from 20 to 100 and at least one preferably trifunctional polyether alcohol having a hydroxyl number in the range from 160 to 250 and substantially propylene oxide units in the chain.

A disadvantage of such foams is, for example, that, particularly when tolylene diisocyanate (TDI) is used as polyisocyanate, their high proportion of closed cells which leads to problems in processing and to relatively poor mechanical properties.

Furthermore, the viscoelastic properties can be achieved by using mixtures of at least one polyether alcohol having a high content of ethylene oxide, preferably at least 50% by weight, and at least one polyether alcohol which is incompatible with the first polyether alcohols and has a high content of propylene oxide, preferably at least 90% by weight, as compounds having at least two hydrogen atoms which are reactive toward isocyanate groups.

US 2004/0254256 thus describes viscoelastic foams in whose production the polyol component comprises from 30 to 70 parts by weight of a polyether alcohol having a high proportion of ethylene oxide units in the polyether chain. EP 1 240 228 describes the production of viscoelastic foams using polyether alcohols which have a content of ethylene oxide in the polyether chain of at least 50% by weight and a hydroxyl number in the range from 40 to 50.

DE19936481 describes sound-absorbing, easy-to-process molded flexible PUR foams which have a loss factor of >0.2 and comprise at least one castor oil polyetherol prepared by anionic polymerization using, for example, alkali metal hydroxides or cationic polymerization of castor oil with alkylene oxides. Pure castor oil can optionally be added, but in an amount of not more than 10%. A disadvantage here is that only small amounts of pure castor oil can be processed. Only as a result of the use of castor oil derivatives, which have to be prepared from castor oil in an additional production step, is the proportion of renewable raw materials increased significantly. A further disadvantage is, according to WO 04/20497, that flexible polyurethane foams produced from polyether alcohols based on renewable raw materials such as castor oil display very poor properties in respect of odor, emissions and fogging when basic catalysts are used.

DE 3316652 describes moldings composed of viscoelastic foams having noise-reducing properties which are based on significant proportions of castor oil and have a material density of at least 120 kg/m³ and are self adhesive and can therefore be adhesively bonded to support materials.

DE 3710731 describes flexible foams which have sound-insulating and sound-deadening properties which have a material density of 80-250 kg/m³, can comprise castor oil as constituent and are preferably produced by the RIM (reaction injection molding) process. These molded foams have a loss factor of at least 0.4. They have an adhesive surface due to processing of the reaction mixture at an NCO index of ≦80.

DE3708961 describes molded foams which have a low rebound resilience and comprise castor oil and display, without secondary adhesion promoters, adhesion to coated and uncoated metallic surfaces.

DE-A-19924803 describes molded foams having latex-like behavior. Owing to loss factors of >0.15 and rebound resiliences of <30%, said foams can also be referred to as viscoelastic. A disadvantage here is that the molded foams described have a very sticky surface.

DE19634392 describes the production of foamed polyurethane moldings using at least 50% by weight of castor oil in combination with chain extenders and/or crosslinkers having reactive hydroxyl groups. These moldings have very high stiffnesses and compressive strengths and are therefore unsuitable for the usual uses of flexible foams.

For ecological reasons, the market is increasingly demanding foams which comprise renewable raw materials. In the production of polyurethanes, renewable raw materials can also be an alternative to petrochemically produced starting materials. The foams are usually produced using natural materials comprising hydroxyl groups or using polyols which are prepared by addition of alkylene oxides onto these compounds.

WO 2007/085548 shows how viscoelastic foams which have a loss factor of >0.15 or a rebound resilience of <30% can be produced on the basis of renewable raw materials, preferably castor oil. The foams preferably display viscoelastic behavior over a wide temperature range. A disadvantage here is that foams can only be made available by the slabstock foam process. The overall reactivity of the starting materials is insufficient for the manufacture of molded foams.

WO 2008/003567 describes a process for producing viscoelastic slabstock foams using castor oil and polyether alcohols having differing contents of ethylene oxide in the polyether chain. Relatively large amounts of polyether alcohols which are low in ethylene oxide and polyether alcohols which are rich in ethylene oxide are used in this process. This can lead to compatibility problems in the polyol component, right through to demixing.

It was accordingly an object of the present invention to provide preferably flexible polyurethane foams having viscoelastic properties and largely tack-free surfaces using renewable raw materials. The foams should be able to be produced as flexible molded foams and as flexible slabstock foams. The proportion of renewable raw materials in the polyol component should be high; at least 25% by weight of the weight of the foam should preferably comprise renewable raw materials.

The invention accordingly provides a process for producing viscoelastic flexible polyurethane foams by reacting
a) polyisocyanates with
b) compounds having at least two hydrogen atoms which are reactive toward isocyanate groups, wherein a mixture of
   bi) from 25 to 70% by weight, based on the weight of the components bi), bii), biii) and biv), of a hydroxyl-comprising natural oil or fat or a reaction product of a hydroxyl-comprising natural oil or fat with alkylene oxides,
   bii) from 3 to 30% by weight, based on the weight of the components bi), bii), biii) and biv), of at least one polyether alcohol which has a hydroxyl number of from 100 to 800 mg KOH/g and a functionality of from 3 to 5 and is selected from the group consisting of polyether alcohols prepared by addition of alkylene oxides onto an amine,
   biii) 20-50% by weight, based on the weight of the components bi), bii), biii) and biv), of at least one polyether alcohol which has a hydroxyl number of from 10 to 80 mg KOH/g and a functionality of from 2 to 5 and can be prepared by addition of ethylene oxide and propylene oxide onto H-functional starter substances, where the proportion of ethylene oxide is 5-25% by weight, based on the weight of the polyether alcohol, and at least part of the ethylene oxide is added on at the end of the polyether chain,
   biv) >0-8% by weight, based on the weight of the components bi), bii), biii) and biv), of at least one polyether alcohol having a functionality of 2-4, a hydroxyl number of 15-60 mg KOH/g and a content of ethylene oxide of >50% by weight, based on the weight of the polyether alcohol,
as compounds having at least two hydrogen atoms which are reactive toward isocyanate groups.

The invention further provides viscoelastic flexible polyurethane foams produced by this process.

As hydroxyl-comprising natural oils or fats bi), it is possible, in particular, castor oil, polyhydroxy fatty acid, ricinoleic acid, hydroxyl-modified oils such as grapeseed oil, black cumin oil, pumpkin seed oil, borage seed oil, soybean oil, wheat germ oil, rapeseed oil, sunflower oil, peanut oil, apricot kernel oil, pistachio nut oil, almond oil, olive oil, macadamia nut oil, avocado oil, sea buckthorn oil, sesame oil, hemp oil, hazelnut oil, evening primrose oil, wild rose oil, hemp oil, safflower oil, walnut oil, hydroxyl-modified fatty acids and fatty acid esters based on myristoleic acid, palmitoleic acid, oleic acid, vaccenic acid, petroselinic acid, gadoleic acid, erucic acid, nervonic acid, linoleic acid, α- and γ-linolenic acid, stearidonic acid, arachidonic acid, timnodonic acid, clupanodonic acid, cervonic acid. Preference is given to using castor oil and hydrogenated castor oil, in particular castor oil.

The natural oils and fats can be modified by means of an addition reaction with alkylene oxides. Here, alkylene oxides are preferably added on in such an amount that the hydroxyl number of the addition product is 20-150 mg KOH/g. The addition reaction with the alkylene oxides can preferably be carried out using DMC catalysts.

The compounds bi) preferably have a functionality of 2-4. The hydroxyl number of the component bi) when no alkylene oxide has been added on is preferably in the range 20-200 mg KOH/g, particularly preferably 100-200 mg KOH/g.

The component bi) is preferably used in an amount of 30-60% by weight, particularly preferably 40-50% by weight, based on the weight of the components bi), bii), biii) and biv).

The amines used for preparing the component bii) are usually diamines. These can be aliphatic amines such as ethylenediamine, propylenediamine or aromatic amines such as toluenediamine (TDA). When TDA is used, particular preference is given to using the o-isomers, also referred to as vicinal TDA.

The polyether alcohols bii) can be pure propoxylates. Ethylene oxide can also be used concomitantly, in particular when aromatic amines are used. The amount of ethylene oxide used is then preferably in the range 2-15% by weight, based on the polyether alcohol.

The component bii) preferably has a hydroxyl number in the range from 150 to 500 mg KOH/g.

The component bii) is preferably used in an amount of from 5 to 25% by weight, particularly preferably from 5 to 15% by weight, based on the weight of the components bi), bii), biii) and biv).

The component biii) preferably has a hydroxyl number of from 15 to 60 mg KOH/g, particularly preferably from 25 to 45 mg KOH/g.

The functionality of the component biii) is preferably from 2 to 5, more preferably from 2 to 4 and particularly preferably from 2 to 3.

The component biii) is preferably used in an amount of from 25 to 40% by weight, based on the weight of the components bi), bii), biii) and biv).

In a preferred embodiment of the invention, the component biii) comprises at least 80% by weight, based on the weight of the component biii), of polyether alcohols having a content of ethylene oxide in the polyether alcohol of from 10 to 25% by weight, based on the weight of the polyether alcohol. Preference is given to at least half of the ethylene oxide being added on at the end of the chain. In a particularly preferred embodiment, the total amount of ethylene oxide is added on at the end of the chain.

The component biii) preferably comprises polyether alcohols which have a content of primary hydroxyl groups of at least 50%, based on the total number of hydroxyl groups.

The component biv) is preferably used in an amount of 1-8% by weight, particularly preferably 3-5% by weight, in each case based on the weight of the components bi), bii), biii) and biv).

The component b) preferably consists of only the constituents bi), bii), biii) and biv). However, it is also possible for the component b) to comprise further constituents.

These can be polyether alcohols different from bi), bii), biii) and biv).

Furthermore, the component b) can also comprise chain extenders and crosslinkers. These are preferably H-functional compounds having molecular weights of from 62 to 400 g/mol, in particular 2- to 3-functional alcohols, amines or amino alcohols. They are present in an amount of, in particular, from 0 to 25% by weight, preferably from 2 to 12% by weight, based on the weight of the component b).

It is in principle possible to use all known compounds having at least two isocyanate groups in the molecule as polyisocyanates a). Preference is given to using diisocyanates. Diphenylmethane diisocyanate (MDI) and/or tolylene diisocyanate (TDI), preferably MDI, are preferably used for the process of the invention.

When MDI is used, it is possible to use the pure 4,4' isomer, the pure 2,4' isomer and also any mixtures of the two isomers which can further comprise up to 5% by weight of the 2,2' isomer. Use is frequently made of modified isocyanates in place of the pure isocyanates or in admixture therewith, since pure MDI as a solid is difficult to process. Such modified isocyanates can be formed, for example, by incorporation of groups into the polyisocyanates. Examples of such groups are urethane, allophanate, carbodiimide, uretonimine, isocyanurate, urea and biuret groups.

Particular preference is given to isocyanates modified with urethane groups, which are usually prepared by reacting the isocyanates with a substoichiometric amount of H-functional compounds. Such compounds are frequently also referred to as NCO prepolymers. These prepolymers preferably have an NCO content of from 20 to 30% by weight, in particular from 24 to 29% by weight. The H-functional compounds used in the preparation of the prepolymers are usually polyfunctional alcohols, preferably polyether alcohols. In one embodiment of the invention, castor oil can also be used for preparing the prepolymers. This is not considered to be part of component bi).

Particular preference is likewise given to carbodiimide- or uretonimine-comprising polyisocyanates which can be formed by targeted catalytic reaction of isocyanates with themselves.

In a further embodiment of the invention, mixtures of diphenylmethane diisocyanate and polyphenylenepolymethylene polyisocyanates, also referred to as crude MDI, are used as polyisocyanates a).

The flexible polyurethane foams of the invention are usually produced in the presence of blowing agents, catalysts and auxiliaries and/or additives.

As blowing agent, preference is given to using water. The amount of the water used depends on the desired density of the foam and is preferably in the range 1-5% by weight, based on the weight of the component b).

In place of or together with the water, it is also possible to use physically acting blowing agents. These are preferably liquids which are inert toward the polyurethane formation components and have boiling points of less than 100° C., preferably less than 50° C., in particular in the range from 50 to 30° C., and vaporize under the influence of the exothermic polyaddition reaction. Examples of such liquids are hydrocarbons such as n-pentane, isopentane and/or cyclopentane, ethers, ketones, halogenated hydrocarbons as long as they have no ozone depletion potential. Furthermore, gases which are inert toward the formative components for the polyurethane, e.g. nitrogen or noble gases, but in particular carbon dioxide, can be used as physical blowing agents. The amount of the liquid physically acting blowing agents is usually from 1 to 20 parts by weight, preferably from 2 to 15 parts by weight, based on 100 parts by weight of the compound having at least 2 hydrogen atoms which are reactive toward isocyanate. The amount of blowing agents used depends on the desired density of the foams.

To carry out the reaction, the customary polyurethane catalysts are usually employed. These are, for example, tertiary amines such as triethylenediamine, metal salts such as tin compounds and also any mixtures of these compounds.

Auxiliaries and/or additives used are, for example, flame retardants, surface-active substances, stabilizers, cell regulators, fungistatic and bacteriostatic substances, antistatics, dyes, pigments and fillers. These materials are added to the foam system when required in order to give it particular properties.

Further details regarding the components used may be found, for example, in Kunststoff-Handbuch, Volume VII Polyurethane, Carl Hanser Verlag, Munich, Vienna, 1st to 3rd Edition, 1966, 1983 and 1993.

The compounds having at least two hydrogen atoms which are reactive toward isocyanate groups b), the blowing agents, the catalysts and any auxiliaries and/or additives used are usually mixed to form a polyol component and reacted in this form with the polyisocyanates a).

To produce the flexible polyurethane foams of the invention, the starting compounds are usually reacted at temperatures of from 0 to 100° C., preferably from 15 to 60° C., in such ratios that from 0.5 to 2, preferably from 0.6 to 1.3 and in particular 0.7 to 1, reactive hydrogen atom(s) is/are present per NCO group and, when water is used as blowing agent, the two hydrogen atoms of the water are included in the calculation of the total number of reactive hydrogen atoms.

The flexible polyurethane foams of the invention are preferably produced by the one-shot process by mixing the polyol and isocyanate components, with the polyol component comprising, as described above, the compounds having at least two hydrogen atoms which are reactive toward isocyanate, optionally catalysts, blowing agents and also auxiliaries and/or additives and the isocyanate component comprising the polyisocyanate and also optionally catalysts, physical blowing agents and also auxiliaries and/or additives. The two components are intensively mixed and usually foamed as molded foam. Here, no compatibility problems and no demixing occur in the polyol component.

As stated above, the foams according to the invention are viscoelastic foams. The properties of these foams have been described above. The foams according to the invention likewise have these above-described features.

The foams according to the invention are used, in particular, for insulating and damping elements, in particular in vehicle construction, for upholstered furniture or furniture for sitting or lying, for mattresses or cushions in the orthopedic and/or medical sector or for shoe soles or insoles. Further uses are safety components of automobiles, surfaces for depositing things, armrests and similar parts in the furniture sector and in automobile construction.

The invention is illustrated by the following examples.

Polyol 1: glycerol-initiated polyoxypropylene-polyoxyethylene polyol, hydroxyl number=26 mg KOH/g, ethylene oxide content=21% by weight, based on the polyol, as end block Polyol 2: glycerol-initiated polyoxypropylene-polyoxyethylene polyol, hydroxyl number=42 mg KOH/g, ethylene oxide content=72% by weight, based on the polyol, of which 5% by weight, based on the polyol, is present as end block Polyol 3: ethylenediamine-initiated polyoxypropylene polyol, hydroxyl number=470 mg KOH/g Tegostab® B 8716LF: silicone stabilizer, Evonik Tegostab® B 4113: silicone stabilizer, Evonik Lupragen® N 201: diazabicyclooctane, 33% strength in dipropylene glycol, BASF SE Lupragen® N 206: bis(N,N-dimethylaminoethyl) ether, 70% strength in dipropylene glycol, BASF SE Niax® A 107: amine catalyst, Momentive A homogenous polyol component was prepared by mixing the polyols, catalysts and additives indicated in the table. The amounts indicated are percentages by weight.

The polyol component was intensively mixed with the MDI-based isocyanate component at the index indicated and the mixture was introduced into a metal mold which had a volume of 14.5 liters and dimensions of 40*40*10 cm and was chamfered on one side and had been heated to 55° C., in which, after closing of the lid for 8-10 minutes, it cured to give the flexible foam. In example 1, the polyol component and the MDI component were mixed manually. In examples 2-4, the polyol component and the MDI component were mixed mechanically by means of a high-pressure Puromat PU SV 20/3 from Elastogran Maschinenbau GmbH.

|  | Example 1 (6) | Example 2 (11) | Example 3 (13) | Example 4 (15) |
|---|---|---|---|---|
| Castor oil, grade DAB | 50 | 50 | 50 | 50 |
| Polyol 1 | 32.65 | 32.65 | 32.65 | 32.65 |
| Polyol 2 | 5 | 5 | 5 | 5 |
| Polyol 3 | 5 | 5 | 5 | 5 |
| 1,4-Butanediol | 5 | 5 | 5 | 5 |
| Tegostab B 8716LF |  | 0.3 | 0.3 | 0.3 |
| Tegostab B 4113 | 0.3 | — | — |  |
| Lupragen N 201 | 0.25 | 0.25 | 0.25 | 0.25 |
| Lupragen N 206 | 0.3 |  | — |  |
| Niax A 107 |  | 0.3 | 0.3 | 0.3 |
| Water | 1.5 | 1.5 | 1.5 | 1.5 |
| Index | 70 | 70 | 65 | 75 |
| Demolding in min | 10 | 8 | 8 | 8 |
| Mold temperature in ° C. | 55 | 55 | 55 | 55 |
| Mold size in l | 14.5 | 14.5 | 14.5 | 14.5 |
| Cushion weight in g | 1198 | 978 | 1172 | 1180 |
| Foam density in kg/m$^3$ | 83 | 67 | 81 | 82 |
| Remark | tack-free | tack-free | tack-free | tack-free |
| Processing | manual | machine | machine | machine |
| Compressive strength 40% in kPa | 1.8 | 1.4 | 1.3 | 3.3 |
| CS in % | 8.9 | 6.2 | 6.9 | 5.0 |
| Rebound resilience in % | 16 | 17 | 16 | 14 |
| tan delta at 25° C. | 0.27 | 0.31 | 0.25 | 0.34 |
| tan delta at −20° C. | 0.52 | 0.53 | 0.54 | 0.38 |
| tan delta at 50° C. | 0.21 | 0.2 | 0.15 | 0.21 |
| Proportion of renewable raw materials in % by weight in the foam | 34.5 | 34.5 | 35.2 | 33.7 |

Iso 145/8 from Elastogran GmbH based on a mixture of diphenylmethane diisocyanates and polyphenylenepolymethylene polyisocyanates was used as isocyanate component. The NCO content is 32.8%.

The properties indicated were determined in accordance with the standards below:

| | |
|---|---|
| Foam density in kg/m$^3$ | DIN EN ISO 845 |
| Compressive strength, 40% deformation in kPa | DIN EN ISO 2439 |
| Rebound resilience in % | DIN EN ISO 8307 |
| Compression set in % | DIN EN ISO 3386 |
| Loss factor tan delta: | torsion pendulum test in accordance with DIN 53445 |

The stickiness was assessed by, immediately after removal from the mold, testing whether the surface is sticky by placing a hand on the surface of the fresh foam.

The invention claimed is:

1. A process for producing a viscoelastic flexible polyurethane foam, comprising:
   reacting
   a) at least one polyisocyanate with
   b) compounds having at least two hydrogen atoms which are reactive toward isocyanate groups, in a mixture comprising
   bi) from 25 to 70% by weight of castor oil, based on a weight of components bi), bii), biii), and biv),
   bii) from 3 to 30% by weight, based on the weight of the components bi), bii), biii), and biv), of at least one first polyether alcohol which has a hydroxyl number of from 100 to 800 mg KOH/g and a functionality of from 3 to 5 and is prepared by addition of at least one alkylene oxide onto an amine,
   biii) 20-50% by weight, based on the weight of the components bi), bii), biii), and biv), of at least one second polyether alcohol which has a hydroxyl number of from 10 to 80 mg KOH/g and a functionality of from 2 to 5 and is prepared by addition of ethylene oxide and propylene oxide onto at least one H-functional starter substance, where a proportion of ethylene oxide is 5-25% by weight, based on a weight of the polyether alcohol, and at least part of the ethylene oxide is added on at an end of a chain the second polyether alcohol,
   biv) >0-5% by weight, based on the weight of the components bi), bii), biii), and biv), of at least one third polyether alcohol having a functionality of 2-4, a hydroxyl number of 15-60 mg KOH/g, and a content of ethylene oxide of >50% by weight, based on the weight of the third polyether alcohol.

2. The process of claim 1, wherein the component bi) is present in an amount of 30-60% by weight, based on the weight of the components bi), bii), biii), and biv).

3. The process of claim 1, wherein the component bii) has a hydroxyl number in a range from 150 to 500 mg KOH/g.

4. The process of claim 1, wherein the component bii) is present in an amount of from 3 to 20% by weight, based on the weight of the components bi), bii), biii), and biv).

5. The process of claim 1, wherein the component biii) has a hydroxyl number of from 2 to 60 mg KOH/g.

6. The process of claim 1, wherein the component biii) is present in an amount of from 25 to 40% by weight, based on the weight of the components bi), bii), biii), and biv).

7. The process of claim 1, wherein the component biv) is present in an amount of 1-5% by weight, based on the weight of the components bi), bii), biii) and biv).

8. The process of claim 1, wherein the component biv) has a content of ethylene oxide of >70% by weight, based on the weight of the third polyether alcohol.

9. The process of claim 1, wherein polyisocyanate a) comprises diphenylmethane diisocyanate.

10. The process of claim 1, wherein polyisocyanante a) comprises at least one diphenylmethane diisocyanate and at least one polyphenylenepolymethylene polyisocyanates.

11. The process of claim 1, wherein polyisocyanante a) comprises at least one isocyanate group- or urethane group- comprising reaction product of diphenylmethane diisocyanate and at least one compound having at least one hydrogen atom which is reactive toward isocyanate groups.

12. The process of claim 11, wherein castor oil is the compound having at least one hydrogen atom which is reactive toward isocyanate groups.

13. The process of claim 1, wherein the reacting is carried out in the presence at least one of blowing agent.

14. The process of claim 13, wherein the blowing agent comprises water.

15. A flexible polyurethane foam, produced by the method of claim 1.

16. The process of claim 2, wherein the component bii) has a hydroxyl number in a range from 150 to 500 mg KOH/g.

17. The process of claim 2, wherein the component bii) is present in an amount of from 3 to 20% by weight, based on the weight of the components bi), bii), biii), and biv).

18. The process of claim 3, wherein the component bii) is present in an amount of from 3 to 20% by weight, based on the weight of the components bi), bii), biii), and biv).

19. The process of claim 2, wherein the component biii) has a hydroxyl number of from 2 to 60 mg KOH/g.

20. The process of claim 3, wherein the component biii) has a hydroxyl number of from 2 to 60 mg KOH/g.

21. The process of claim 1, wherein the third polyether alcohol (biv) is present in an amount of 3-5% by weight.

* * * * *